United States Patent Office 3,267,130
Patented August 16, 1966

3,267,130
PROCESS FOR SYNTHESIZING AMINO NITRILES
Jiro Kato and Ryoji Iwanaga, Ota-ku, Tokyo, Ichiro Noda, Tozuka-ku, Yokohama, and Kazuyuki Tahara, Suginami-ku, Tokyo, Japan, assignors to Ajinomoto Co., Inc., Tokyo, Japan
No Drawing. Filed May 21, 1963, Ser. No. 282,159
Claims priority, application Japan, Dec. 30, 1959, 34/41,232
10 Claims. (Cl. 260—465.5)

This application is a continuation-in-part of our copending application Serial Number 32,129, filed on May 27, 1960, and now abandoned.

The present invention relates to a process for synthesizing amino acids from a dilute hydrogen cyanide-containing gas mixture.

It is well known to react carbonyl compounds with hydrogen cyanide and ammonia, or with cyanides and ammonium salts to produce aminonitriles, and to hydrolyze the latter to obtain amino acids.

However, the best known process for producing aminonitriles from carbonyl compounds uses liquid hydrogen cyanide, and is uneconomical on account of the high cost of said chemical which is also extremely dangerous to handle.

The known process for synthesis of amino acids from a cyanide and an ammonium salt is disadvantageous, because the raw materials are expensive and complicated treatments are necessary for separating the formed amino acid from a simultaneously produced inorganic salt.

It has now been found that amino acids can be easily and economically synthesized without the shortcomings of the known processes by reacting a gaseous mixture containing a comparatively small amount of hydrogen cyanide, such as the mixtures produced catalytically from methane and ammonia, or carbon monoxide and ammonia with a carbonyl compound or its solution in the presence of at least 0.8 mole of ammonia per mole of hydrogen cyanide. An aminonitrile is formed and then hydrolyzed.

The equilibrium vapor pressures of hydrogen cyanide above its aqueous solutions at different concentrations and temperatures may be derived from a diagram on page 629 of Ullmann: "Encyklopädie der technischen Chemie," Band 5 (1954), approximately as follows:

*Vapor pressure of HCN (mm. Hg)*

| HCN percent in aqu. solution | Temperature (° C.) | | | |
|---|---|---|---|---|
| | 0 | 10 | 20 | 30 |
| 1 | 12 | 17 | 25 | 39 |
| 2 | 25 | 37 | 50 | 75 |
| 3 | 37 | 55 | 75 | |
| 4 | 48 | 70 | 98 | |
| 5 | 62 | 92 | | |
| 6 | 72 | 110 | | |

The vapor pressure equilibrium of hydrogen cyanide is seen to favor the gaseous phase. Accordingly, hydrogen cyanide is not readily absorbed in the aqueous solution of a carbonyl compound from a hydrogen cyanide containing gas. Andrussow's process, the conventional process for industrial production of hydrogen cyanide, yields a gaseous reaction mixture which contains about 6–8% hydrogen cyanide and a large amount of water-insoluble inert gases such as nitrogen, carbon monoxide, hydrogen, and methane. It is extremely difficult to absorb the hydrogen cyanide efficiently from this mixture by means of a liquid absorbent.

We have found that this difficulty can be overcome, and that the hydrogen cyanide can be completely absorbed when the hydrogen cyanide-containing gas mixture is contacted with a solution of a carbonyl compound in the presence of ammonia. Certain carbonyl compounds are unstable in an alkaline solution and polymerize readily. In such cases, we have effectively carried out the process of the invention by adding ammonia to the hydrogen cyanide-containing gas, and by contacting the gaseous mixture with a solution of the carbonyl compound. With more stable carbonyl compounds, the ammonia may be added to the solution.

The favorable course of the reaction according to this invention is presumably due to the following facts:

The vapor pressure of gaseous ammonia in an aqueous solution is appreciably lower than that of hydrogen cyanide. Ammonia is therefore preferentially absorbed in an aqueous solution of a carbonyl compound from a gaseous mixture of ammonia and hydrogen cyanide. Hydrogen cyanide is then absorbed in the liquid to from ammonium cyanide, and the latter is consumed by the reaction with the carbonyl compound. The absorption proceeds further until the hydrogen cyanide in the gas mixture is completely utilized in the reaction.

An ammoniacal aqueous solution of hydrogen cyanide is unstable in the presence of 3 moles of ammonia per mole of hydrogen cyanide or less, but the carbonyl compound reacts instantly in the method according to this invention with the hydrogen cyanide in the presence of sufficient ammonia to form a cyanohydrin, whereby the reaction can be performed successfully at a relatively low concentration of ammonia.

When a gaseous mixture containing low concentrations of hydrogen cyanide and ammonia is contacted with a solution of a carbonyl compound either in countercurrent flow or in parallel flow, the small quantity of hydrogen cyanide present in the mixture is completely absorbed by the solution and the formation of the corresponding cyanohydrin proceeds smoothly.

Ammonia is one of the raw materials in the conventional Andrussow method of producing hydrogen cyanide, and unreacted ammonia is present in the reaction mixture. Since ammonia is also one of the raw materials for Strecker's synthesis, it is quite convenient to add ammonia gas to the gaseous reaction mixture produced by the Andrussow method. Instead of adding ammonia to the mixture after the Andrussow reaction, the concentration of ammonia in the raw materials employed for producing hydrogen cyanide may be increased to such an extent that the excess ammonia is still available for the subsequent operation, the gas-liquid reaction according to this invention.

The relationship between the amount of ammonia present and the amount of hydrogen cyanide absorbed in an aqueous solution of $\beta$-cyanopropionaldehyde has been determined as follows:

A mixed gas consisting of 12.5% methane (purity: 94%), 11.3% ammonia and 76.2% air was passed through a platinum-rhodium alloy screen to react the constituents with each other. The gaseous reaction mixture contained 5.1% hydrogen cyanide and 1.7% ammonia. Ammonia was added to portions of this mixture in such amounts that the ratio of ammonia to hydrogen cyanide was 0.37, 0.63, 0.78 and 0.86, respectively. Each gas portion was fed to a glass cylinder 115 cm. high and 3.7 cm. in diameter and filled with McMahon's packings. The gas was introduced from the bottom of the cylinder at a rate of 1.3 m.³/hr. (reduced to 0° C. and 1 atm.), and an aqueous 2-molar solution of $\beta$-cyanopropionaldehyde was introduced into the cylinder from its top at a rate of 1.2 liters per hour. The glass cylinder was provided with a jacket in which cold water was circulated to keep the interior at 17.3° C. The waste gas discharged from the top was passed through 0.1 N aqueous caustic soda solution to absorb the residual hydrogen cyanide, and the latter was titrated with a standard solution of silver nitrate. The absorption rate, that is, the percentage of the hydrogen cyanide absorbed was found to be 79.3%, 88.8%, 98.2% and 100% respectively.

It will be appreciated from these experiments that the presence of ammonia is extremely significant in the absorption of hydrogen cyanide. Although the presence of 0.8 mole of ammonia per mole of hydrogen cyanide contained in the gas mixture is sufficient for the practically complete absorption of hydrogen cyanide, the presence of additional ammonia during absorption of the hydrogen cyanide is not objectionable. However, when too much ammonia is present, a major portion thereof is lost in the exhaust gas together with the large quantity of inert gases present in the raw gas mixture. The most economical ratio of ammonia to hydrogen cyanide depends upon the temperature at which the operation is carried out and will be readily determined for specific operating conditions.

The following examples illustrate the invention but are not to be construed as limiting the same:

Example 1

A gas mixture consisting of 12.5% methane (purity: 94%), 11.3% ammonia and 76.2% air was passed through a platinum-rhodium alloy screen to react the constituents with each other. The gaseous reaction mixture contained 6.8% hydrogen cyanide and 2.2% ammonia, and was enriched with 54.9 volume percent ammonia. It was then fed to a glass cylinder 115 cm. high and 3.7 cm. in diameter, and filled with McMahon's packings. The gas was fed from the bottom at a rate of 1 m.³/hr. (reduced to 0° C. and 1 atm.), and an aqueous 2-molar solution of β-cyanopropionaldehyde was simultaneously introduced into the cylinder from the top at a rate of 1.2 liters per hour. The glass cylinder was jacketed to circulate cold water and the maximum temperature in the interior of the cylinder was kept at 18.8° C. The gas discharged from the top was free of hydrogen cyanide. 1.7 liters of 25% ammonia water were added to each liter of the solution discharged from the bottom which contained mainly α-hydroxy glutarodinitrile, and the strongly ammoniacal liquid was heated to 120° C. for 2 minutes to complete Strecker's reaction. The aminonitrile formed was hydrolyzed with aqueous caustic soda. The hydrolyzate solution obtained contained 1.66 moles glutamic acid.

Example 2

A gas mixture consisting of 12.4% methane (purity: 84.5%), 11.5% ammonia and 76.1% air was passed through a platinum-rhodium alloy screen to react the constituents with each other. The gaseous reaction mixture contained 7.0% hydrogen cyanide and 2.5% ammonia. 5% ammonia was added, and the resulting gaseous mixture was introduced into the bottom of a stainless steel cylinder of the same size and shape as the glass cylinder of Example 1. The cylinder was filled with Raschig rings. The feed rate of the gas mixture was 0.87 m.³/hr. A 1.8 molar aqueous solution of β-cyanopropionaldehyde was poured into the cylinder from its top at a rate of 1.2 liters per hour. The interior of the cylinder was kept at 13.6° C. or less. Each liter of the effluent solution which contained mainly α-hydroxy glutarodinitrile was mixed with 1.7 liters 25% ammonia water and treated in the same way as described in Example 1. The reaction mixture contained 1.5 moles glutamic acid.

Example 3

A gas mixture consisting of 12.4% methane (purity: 94.5%), 11.5% ammonia and 76.1% air was passed through a platinum-rhodium alloy screen to react the constituents with each other. The gaseous reaction mixture contained 5.2% hydrogen cyanide and 1.7% ammonia. It was mixed with 2.5% ammonia and introduced to the top of the glass cylinder described in Example 1 at a rate of 1.17 m.³/hr. (reduced to 0° C. and 1 atm.). An aqueous two-molar solution of acetaldehyde was fed to the top of the cylinder at a rate of 1.2 liters per hour. Cold water was circulated in the jacket of the glass cylinder to keep the interior at 24° C. or less. 1.7 liters 25% ammonia water were added to each liter of the effluent solution which contained mainly α-hydroxy propionitrile, and the liquid mixture obtained was heated to 120° C. as in Example 1 to complete Strecker's reaction. The aminonitrile produced was hydrolyzed with caustic soda in the usual manner. The aqueous solution formed contained 1.46 moles of alanine. The yield therefore was 85.1% on the basis of the acetaldehyde used. The waste gas discharged from the bottom of the cylinder contained 0.3% of the aldehyde used but no hydrogen cyanide was found in the waste gas.

Example 4

Instead of the aqueous solution of acetaldehyde in Example 3, an aqueous 2-molar solution of formaldehyde was used. The formaldehyde was introduced into the top of the cylinder at a rate of 1.2 liters per hour as in Example 3. A gaseous reaction of methane, ammonia and air yielded a mixture containing 5.2% hydrogen cyanide and 1.7% ammonia. It was enriched with 2.7% ammonia and was introduced to the cylinder top at a rate of 1.29 m.³/hr. to flow down in the same direction as the formaldehyde solution. Cold water was circulated in the jacket of the cylinder to hold the interior temperature at not more than 27° C. 1.7 liters 25% ammonia water were added to each liter of the solution which contained mainly hydroxy acetonitrile discharged from the cylinder. The resulting mixture was held at 120° C. for 2 minutes to complete Strecker's reaction, and finally hydrolyzed with caustic soda. The reaction mixture contained 1.49 moles of glycine. The yield was 87.0% on the basis of the aldehyde used. The exhaust gas from the bottom of the reaction cylinder was free of hydrogen cyanide.

It will be appreciated that the manner in which a dilute gaseous hydrogen cyanide mixture is prepared is not relevant to the method of this invention, but that the invention is particularly useful for the recovery of small amounts of hydrogen cyanide from a gaseous mixture with a large excess of gases inert to an aqueous solution of carbonyl compounds. The concentration of hydrogen cyanide in the gas mixture is not critical. Hydrogen cyanide has been completely recovered in the form of a cyanohydrin or aminonitrile (for the most part) by the method of the invention from gaseous mixtures containing less than three percent HCN and as much as 20 percent HCN.

The conversion of the cyanohydrin to the corresponding aminonitrile by ammonia occurs at a rate which depends inter alia on the concentration of the ammonia present and on the temperature. An addition of 1.7 liters 25% ammonia to each liter of absorption mixture will cause complete conversion of the cyanohydrin present to the corresponding aminonitrile at 120° C. within two minutes, but the ammonia concentration, the reaction temperature, and the reaction time are interdependent. Any two of these factors may be varied at will within wide limits without materially affecting the outcome if the third one is suitably changed. It is entirely possible, for example, to complete the formation of the amino nitrile at room temperature (approximately 20° C.) if a sufficient amount of ammonia is present. Excessive temperatures for long periods are to be avoided for obvious reasons.

The hydrolysis of the aminonitriles produced according to the invention is very conveniently carried out by heating in the presence of aqueous sodium hydroxide solution as is conventional, but the procedure employed for converting the aminonitrile to the corresponding amino acid may be selected from those described in the prior art to suit specific requirements. Time, temperature, and concentration of the hydrolyzing agent may be combined in any suitable manner. Known effective hydrolyzing agents other than sodium hydroxide include other alkaline materials such as barium hydroxide, and acids such as hydrochloric acid.

While the invention has been described with particular reference to specific embodiments, it is to be understood that it is not limited thereto, but is to be construed broadly and restricted solely by the scope of the appended claims.

What we claim is:

1. A process for synthesizing an aminonitrile which comprises:
   (a) contacting an aqueous solution of an aldehyde selected from the group consisting of lower alkanals and lower cyanoalkanals with a gas mixture consisting essentially of a major amount of inert constituents and a minor amount of reactive constituents, said reactive constituents consisting of
      (1) hydrogen cyanide and
      (2) at least 0.8 mole ammonia per mole of said hydrogen cyanide,
      (3) until said aldehyde and said hydrogen cyanide react with each other in the presence of said ammonia to form a cyanohydrin in said solution; and
   (b) reacting said cyanohydrin in said solution with an amount of ammonia sufficient to form the corresponding aminonitrile.

2. A process as set forth in claim 1, wherein said aldehyde is formaldehyde.

3. A process as set forth in claim 1, wherein said aldehyde is acetaldehyde.

4. A process as set forth in claim 1, wherein said aldehyde is beta-cyano propionaldehyde.

5. A process for synthesizing an aminonitrile which comprises:
   (a) contacting an aqueous solution of an aldehyde selected from the group consisting of lower alkanals and lower cyanoalkanals with a gas mixture consisting essentially of a major amount of inert constituents and a minor amount of reactive constituents, said reactive constituents consisting of
      (1) hydrogen cyanide and
      (2) at least 0.8 moles ammonia per mole of said hydrogen cyanide,
      (3) until said hydrogen cyanide and a portion of said ammonia are absorbed in said aqueous solution, and the hydrogen cyanide absorbed reacts with said aldehyde to form the corresponding cyanohydrin in said solution;
   (b) thereafter admixing an amount of ammonium hydroxide in substantial excess over said hydrogen cyanide to said aqueous solution; and
   (c) heating the mixture obtained until the reaction between the cyanohydrin present in said mixture and said ammonium hydroxide is completed to form an aminonitrile.

6. A process as set forth in claim 1, wherein said inert constituents are substantially insoluble in water.

7. A process as set forth in claim 1, wherein said aqueous solution is held at a temperature not substantially exceeding room temperature during said reaction of said aldehyde with said hydrogen cyanide.

8. A process as set forth in claim 1, wherein said inert constituents of said gas mixture amount to at least 85 percent of said mixture.

9. A process for synthesizing a nitrile which comprises contacting a aqueous solution of an aldehyde selected from the group consisting of lower alkanals and lower cyanoalkanals with gaseous hydrogen cyanide in the presence of at least 0.8 mole ammonia per mole of said hydrogen cyanide.

10. A process for synthesizing a nitrile which comprises contacting an aqueous solution of an aldehyde selected from the group consisting of lower alkanals and lower cyanoalkanals with gaseous hydrogen cyanide in the presence of at least 0.8 mole ammonia per mole of said hydrogen cyanide while simultaneously passing an inert gaseous material through said solution, the amount of said gaseous material being much greater than the combined amount of said hydrogen cyanide and of said ammonia, and said gaseous material being substantially insoluble in said solution.

References Cited by the Examiner

Block: Chemical Reviews, vol. 38, 1946, pp. 523–525.
Gilman et al: "Organic Synthesis," Collective vol. I, second ed., 1941, pp. 21, 298, 321.
Horning: "Organic Synthesis," Collective vol. III, 1955, pp. 34, 66, 84, 88.

CHARLES B. PARKER, *Primary Examiner.*

JOSEPH P. BRUST, *Assistant Examiner.*